(No Model.)

W. S. FRASER.
AUTOMATIC CAR BRAKE.

No. 452,700. Patented May 19, 1891.

WITNESSES:
D. S. Kuhn.
W. F. Struthers

INVENTOR
Wm. S. Fraser

UNITED STATES PATENT OFFICE.

WILLIAM S. FRASER, OF PITTSBURG, PENNSYLVANIA.

AUTOMATIC CAR-BRAKE.

SPECIFICATION forming part of Letters Patent No. 452,700, dated May 19, 1891.

Application filed January 28, 1891. Serial No. 379,430. (No model.)

*To all whom it may concern:*

Be it known that I, WILLIAM S. FRASER, a citizen of the United States, residing at Pittsburg, in the county of Allegheny and State of Pennsylvania, have invented a new and useful Improvement in Automatic Brakes for Street or other Cars, of which the following is a specification.

The object of my invention is to throw certain mechanism into gear by which the backward or forward motion of the car will automatically apply the brakes and that will hold the same at any degree of tension that may be desired and that may then be instantly released before starting the car. I attain these objects by the mechanism illustrated in the accompanying drawings, in which—

Figure 2:
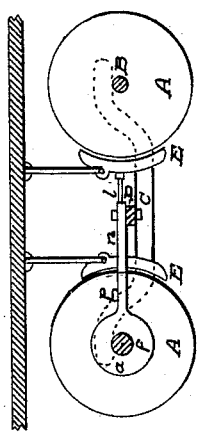
Figure 3:
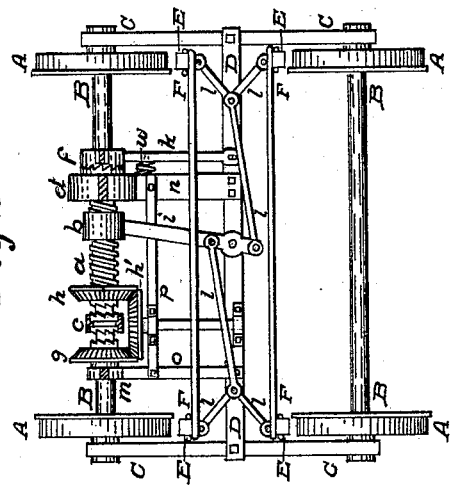
Figure 1:
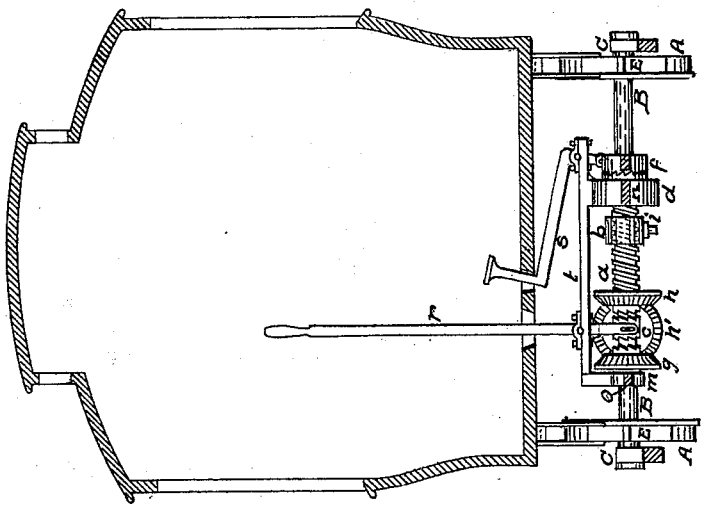

Figure 1 is a vertical cross-section through one of the trucks and body of the car, showing brake mechanism. Fig. 2 is a vertical longitudinal section through the truck and part of bottom of car. Fig. 3 is a top view of truck, showing brake mechanism.

Similar letters refer to similar parts throughout the several views.

The brake mechanism is supported by and geared to the usual car-truck, of which A A A A are the wheels, B B B B the axles, C C C C and D D the frame.

The usual brake-shoes E E E E, rods $l\,l\,l\,l\,l\,l$, and lever $i$ are operated by the screw $a$ and burr $b$, the screw $a$ being hollow and turning loosely on axle of wheels. The clutch $c$, working on a square or with slot and pin on axle B B and operated by the lever $r$, when made to engage with a similar clutch on end of screw $a$, the car having a forward motion, sets the said screw in motion, turning it with said axle and draws the burr $b$ along said screw, the lever $i$ being connected with said burr by a slot and pin on under side of said burr, thus applying the brakes. When the car has stopped or the speed has been sufficiently checked, the clutch $c$ is disengaged from screw $a$, when said screw will hold brakes in position. $d$ is a drum attached to frame D D by the extension-piece $n$ and turns on the cylindrical end of screw $a$, the said drum containing a coiled spring connected with screw $a$ in such manner that when said screw is set in motion the spring within said drum is wound up. The clutch F, turning on axle B B and held to frame D D by the extension-piece K, engages with a similar clutch on end of screw $a$ and takes up and holds the tension on spring contained within drum $d$, said clutch being held in contact with said screw by spring $w$. The clutch F is disengaged from screw $a$ by the foot-lever $s$, thus releasing the coiled spring within drum $d$. The screw is reversed and brakes are released. For throwing brakes on when the car is moving backward the clutch $c$ is engaged by lever $r$ with a corresponding clutch on the bevel-wheel $g$, the said bevel-wheel turning loosely on axle B B, and, being geared with corresponding bevel-wheels $h\,h'$ to screw $a$, it will be seen that screw $a$ is turned in the same direction as when the car, having a forward motion, the clutch $c$ is engaged directly with screw $a$.

$o$ and $p$, in connection with extension-piece $n$ and frame D D, forms the frame work for support of the connecting bevel-wheel $h'$, one end of $o$ being supported by and turning loosely on axle B B.

$t$ is a part of frame secured to drum $d$ and to $o$ for the purpose of supporting the levers $r$ and $s$.

It will be seen that the clutch F being held off by the foot-lever $s$ when brakes are being applied, the spring within drum $d$ will immediately throw off brakes on release of clutch $c$.

I claim and wish to secure by Letters Patent—

1. In combination with an automatic brake, the screw $a$, burr $b$, clutch $c$, operated by lever $r$, and the gear-wheels $g$ and $h\,h$ for the purpose of throwing on the brakes, substantially as described.

2. In an automatic brake, the combination of a drum $d$, having an inclosed spring, a screw $a$, and a burr $b$, all substantially as and for the purpose described.

3. In combination with an automatic brake, the clutch F, operated by the lever $s$, in combination with the drum $d$, for the purpose as set forth.

WM. S. FRASER.

Witnesses:
D. I. KUHN,
W. F. STRUTHERS.